(12) United States Patent
Takeshima et al.

(10) Patent No.: US 7,097,188 B2
(45) Date of Patent: Aug. 29, 2006

(54) RUNNING BOARD FOR AN ALL-TERRAIN VEHICLE, AND VEHICLE INCORPORATING SAME

(75) Inventors: Masao Takeshima, Saitama (JP); Shigeto Inami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 168 days.

(21) Appl. No.: 10/813,902

(22) Filed: Mar. 31, 2004

(65) Prior Publication Data
US 2004/0201197 A1 Oct. 14, 2004

(30) Foreign Application Priority Data
Apr. 4, 2003 (JP) .............................. 2003-102128

(51) Int. Cl.
*B60R 3/00* (2006.01)
(52) U.S. Cl. ..................... 280/163; 280/291; 180/90.6; 296/75
(58) Field of Classification Search ................ None
See application file for complete search history.

(56) References Cited

U.S. PATENT DOCUMENTS

| 5,347,799 | A | * | 9/1994 | Hosaka et al. ................ 56/15.8 |
| D352,683 | S | * | 11/1994 | Miller ........................ D12/126 |
| 5,695,023 | A | * | 12/1997 | Knurr et al. ................. 180/336 |
| 5,893,424 | A | * | 4/1999 | Hisada ........................ 180/90.6 |
| 6,113,121 | A | * | 9/2000 | Mizuta ........................ 280/163 |
| 6,224,134 | B1 | * | 5/2001 | Johnson et al. ................ 296/75 |
| 6,270,106 | B1 | * | 8/2001 | Maki et al. .................. 280/291 |
| 6,390,218 | B1 | * | 5/2002 | Yao ............................ 180/90.6 |
| 6,502,863 | B1 | * | 1/2003 | Takahashi et al. .......... 280/847 |
| 6,755,269 | B1 | * | 6/2004 | Davis et al. ................ 180/89.1 |

FOREIGN PATENT DOCUMENTS

JP          2001071962         3/2001

* cited by examiner

*Primary Examiner*—Christopher P. Ellis
*Assistant Examiner*—Christopher Bottorff
(74) *Attorney, Agent, or Firm*—Carrier, Blackman & Associates, P.C.; William D. Blackman; Joseph P. Carrier

(57) ABSTRACT

A running board for an all-terrain vehicle includes structure for substantially blocking snow, mud and the like from landing onto the running board during operation, and also for blocking engine heat from excessively warming the feet of a rider. In a running board including a step portion which is positioned on a side of a powertrain unit having an operation pedal in a side portion thereof, a partition is provided between the engine and the step portion, the partition including an insertion opening portion into which the operation pedal is inserted. The partition can be made wider since the operation pedal is inserted into the insertion opening portion blocking snow, mud and the like from coming through a space between the running board and the engine. The partition plate also tends to block engine heat from excessively warming the feet of a rider.

19 Claims, 4 Drawing Sheets

RUNNING BOARD FOR AN ALL-TERRAIN VEHICLE, AND VEHICLE INCORPORATING SAME

CROSS-REFERENCE TO RELATED APPLICATIONS

The present invention claims priority under 35 USC 119 based on Japanese patent application No. 2003-102128, filed Apr. 4, 2003.

BACKGROUND OF THE INVENTION

1. Field of the Invention

The present invention relates to a running board for an all-terrain vehicle, and to a vehicle incorporating the running board. More particularly, the present invention relates to a running board including structure that substantially blocks snow, mud and the like from landing on the running board during operation, and that resists transfer of engine heat to the rider's feet.

2. Description of the Background Art

Some all-terrain vehicles, which include running boards, are known. For example, in Japanese Patent Laid-Open No. 2001-71962, an all-terrain vehicle is described including running boards on which a rider can put his or her feet. In the cross-referenced related applications, the running boards are oriented parallel to the sides of the engine, provided in the center of the body. Conventionally, such running boards are plate members, positioned in a substantially horizontal orientation, such that main portions thereof connect to lower rear ends of the front fenders, and to the lower front ends of the rear fenders.

Conventionally, an open space is provided, more or less, between the running boards and the engine inside the body.

As a result, there has been a problem that loose material such as snow, mud and the like are able to enter through this open space and land on the running board, accumulating thereon, when the vehicle is traveling on rough terrain.

Also, there has been another problem that the heat, radiating from the engine toward the feet of a rider, has not been adequately blocked, where the running board is positioned in a substantially horizontal orientation.

Although the known vehicular running boards have some utility for their intended purposes, there is still a need to provide an improved running board for an all-terrain vehicle. More particularly, there is a need for an improved a running board for an all-terrain vehicle, in which structure is provided to substantially block snow, mud and the like from landing on the running board during operation. A need also exists for a running board that resists the transfer of engine heat to the rider's feet.

SUMMARY OF THE INVENTION

Accordingly, it is an object of the present invention to provide a running board for an all-terrain vehicle, in which structure is provided to substantially block snow, mud and the like from landing on the running board during traveling.

It is another object of the present invention to provide a running board for an all-terrain vehicle, in which structure is provided to block heat radiated from the engine toward feet of a rider.

In order to achieve the foregoing object, according to a first aspect of the present invention, a running board (for example, running board 26 is provided) for an all-terrain vehicle (for example, all-terrain vehicle 11 of an embodiment) including a step portion (for example, step portion 46 of an embodiment) which is positioned on a lateral side of an engine (for example, powertrain unit 15 of an embodiment).

The running board according to the first aspect accommodates an operation pedal (for example, change pedal 28 of the embodiment) in a side portion thereof in the body width direction, and a partition (for example, engine partition plate 34 of the embodiment) is provided between the engine and the step portion on which a foot of a rider is put. The partition includes an insertion aperture formed therein to receive (for example, insertion aperture 88 of the embodiment) through which the operation pedal is to be inserted.

Thus, the partition is provided between the engine and the step portion and the partition extends in front-rear direction and the upper-lower direction. Hence, snow, mud and the like coming through a space between the running board and the engine will hit and be blocked by this partition, and will thereby be prevented from landing on the running board. Moreover, heat radiated toward the feet of a rider from the engine will be substantially blocked by the partition.

Furthermore, since the insertion aperture into which the operation pedal is to be inserted is provided in the partition, the partition can be made sufficiently wide to accommodate the operation pedal, whereby snow, mud and the like are substantially prevented from landing onto the running board, and heat from the engine, radiated toward the feet of a rider, can be substantially blocked.

According to a second aspect of the invention, the partition is provided as a body other than a running board main body (for example, running board main body of an embodiment) including the step portion, and includes a slot (for example, slot 96 of an embodiment) reaching an edge of a side to be attached to the running board main body from the insertion aperture.

Thus, upon attachment to the body on which the engine, including the operation pedal is mounted, the running board main body including the step portion is attached thereto in advance, and then the partition is attached to the running board main body separate from the running board main body while allowing the operation pedal to pass therethrough from the edge thereof through the slot reaching the edge, and is inserted into the insertion aperture. In addition, in the partition, since the slot reaches the edge of running board main body from the insertion aperture, the portion split by means of the slot can be fixed to the running board main body when attached to the running board.

According to a third aspect of the invention, a peripheral portion (for example, peripheral portion 89 of the embodiment) forming the insertion aperture of the partition is provided with a stepped structure, where a front side of the peripheral portion is positioned to an engine side, and a rear side thereof is positioned to an opposite side of the engine side in the body width direction.

Thus, the front side of the peripheral portion forming the insertion aperture of the partition is positioned on the engine side, while the rear side thereof is positioned on the opposite side of the engine side in the body width direction. Therefore, snow, mud and the like which hit the partition through a space between the engine and the partition are substantially blocked from entering the insertion aperture.

For a more complete understanding of the present invention, the reader is referred to the following detailed description section, which should be read in conjunction with the accompanying drawings. Note that front, rear, left and right in the description below are front, rear, left and right taken from the vantage point of a driver seated on the vehicle and facing in the forward traveling direction of the vehicle.

DETAILED DESCRIPTION

Figure 1:
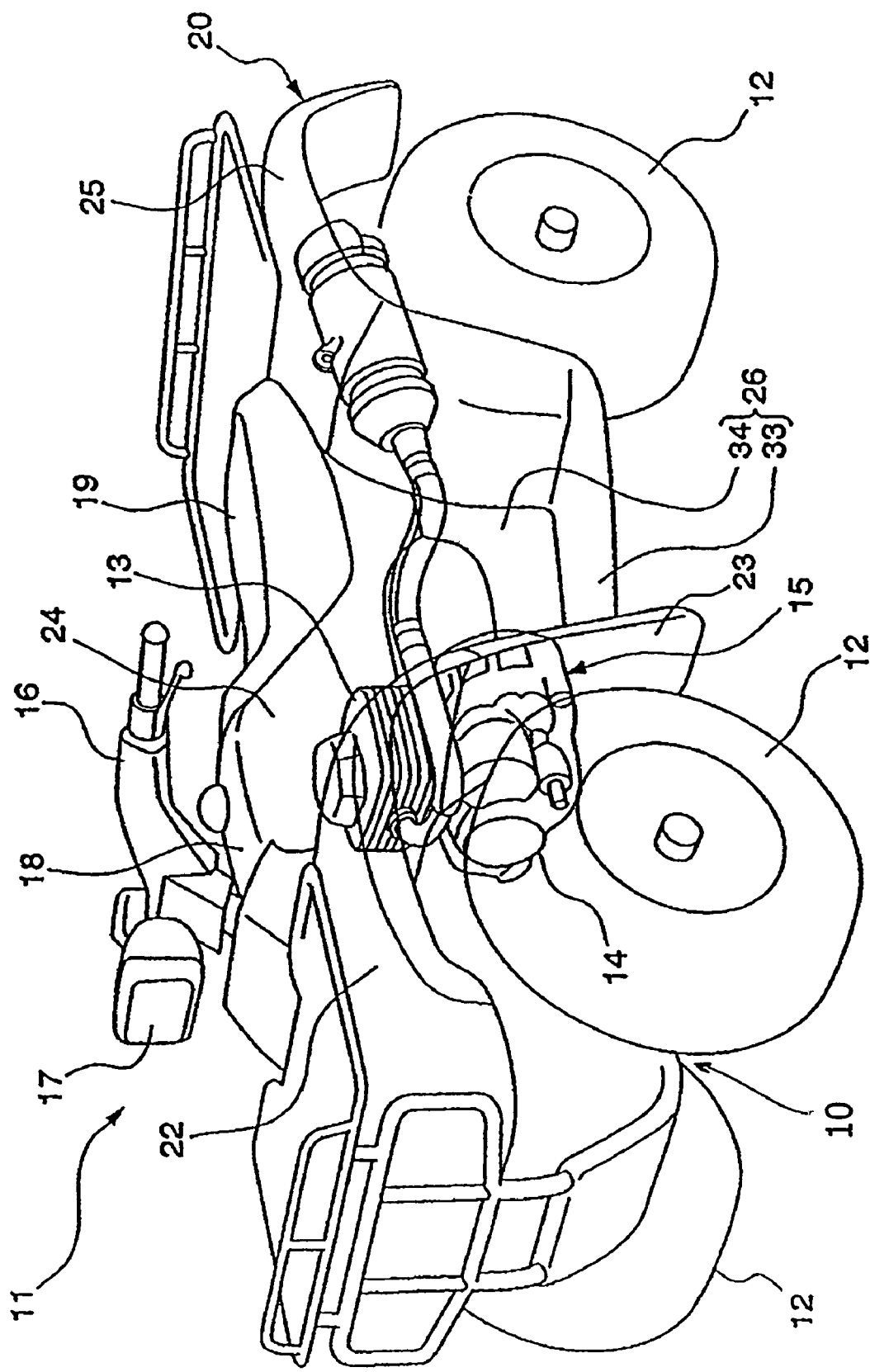
FIG. 1 is a cutaway perspective view of an all-terrain vehicle, showing an engine, transmission, and exhaust components inside the vehicle body.

FIG. 1 is a perspective view of an all-terrain vehicle 11, whose main purpose is to drive on rough terrain.

The all-terrain vehicle 11 depicted in FIG. 1 includes a body 10 with wheels 12 arranged at four corners of the body. The all-terrain vehicle 11 also includes a powertrain unit 15, which includes an engine 13 and a transmission 14, and is mounted at a substantially central position of the body. Note that this all-terrain vehicle 11 is assumed to be of a so-called longitudinal layout type, in which a crankshaft (not shown) of the engine 13 is provided so as to extend in the front-rear direction.

The all-terrain vehicle 11 also includes a handlebar 16, which is installed on an upper front portion of the body 10 so as to extend in the left-right direction. The handlebar 16 is used to steer the front wheels. The all-terrain vehicle 11 also includes a headlight unit 17 supported by the handlebar 16; a fuel tank 18 installed on the body behind the handlebar 16; and a seat 19 installed behind the fuel tank 18.

The all-terrain vehicle 11 further includes a body cover 20, constituting the outer shell of the body 10.

The body cover 20 includes: a front cover 22 covering a front portion of the body 10 including the front wheels 12; left and right sub-fenders 23 provided at the rear of the front cover 22 so as to cover rear portions of the front wheels 12; and a center cover 24. The center cover 24 is provided behind the front cover 22 so as to cover an area of the body 10 extending from the fuel tank 18 to left and right side portions of the body.

The body cover 20 also includes a rear cover 25, provided in the rear of the center cover 24, so as to cover a rear portion of the body including the rear wheels 12; and left and right running boards 26, which are provided behind the sub-fenders 23, and positioned laterally at the sides of the powertrain unit 15 so as to cover front portions of the rear wheels 12.

The running board 26 of this embodiment is specifically one of the running boards 26 which is provided laterally on the left side of the powertrain unit 15. Here, as shown in FIG. 2, on the running board 26 side of the powertrain unit 15, that is, on the left lateral side, a gear change pedal (operation pedal) 28 is provided, for changing gears of the transmission 14.

Figure 3:
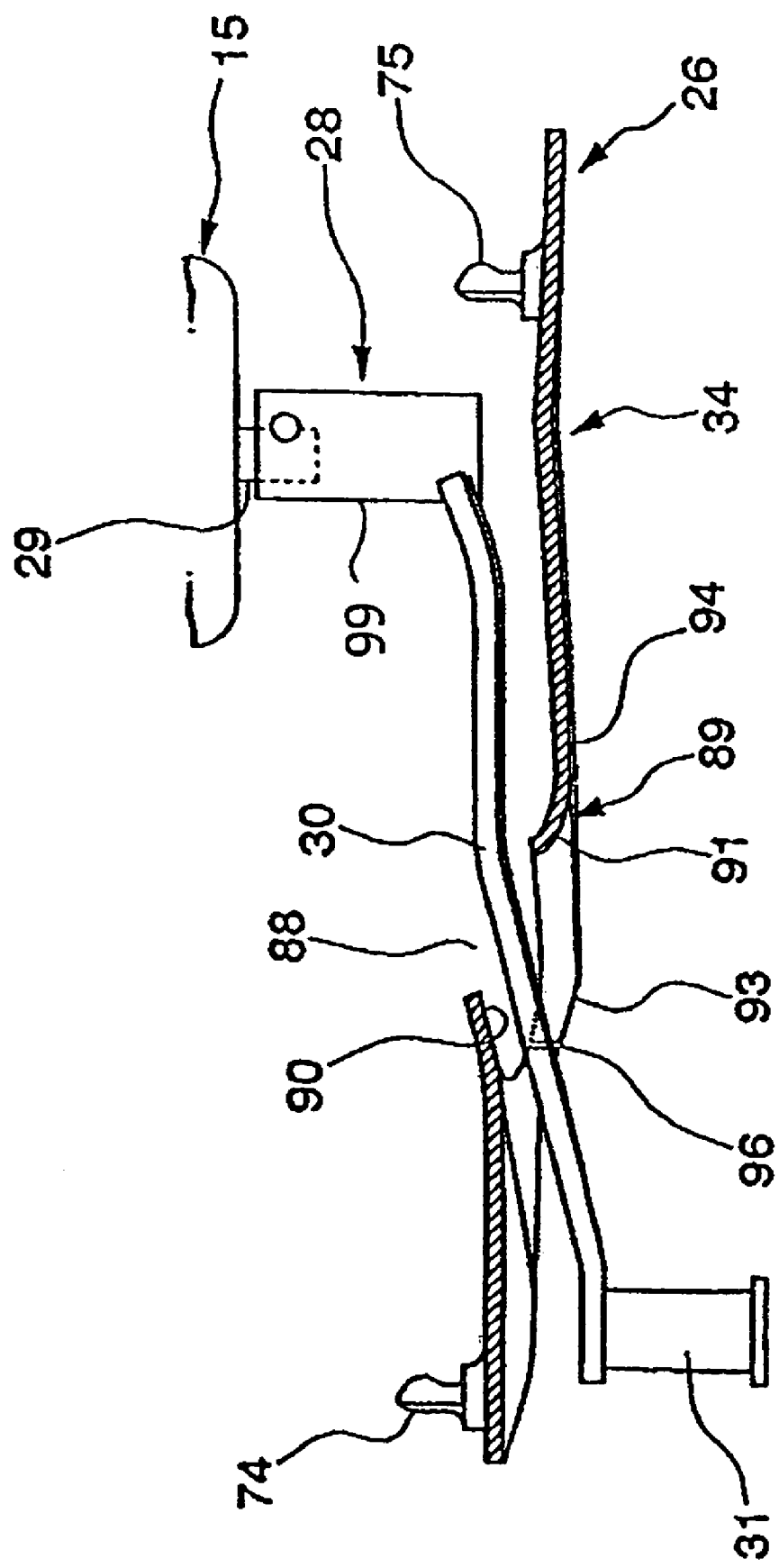
FIG. 3 is a top plane view partially in cross-section, illustrating an insertion aperture of the running board of the all-terrain vehicle according to an embodiment of the present invention.

As shown in FIG. 3, the base end of this change pedal 28 includes a splined socket cup 99 which is fixed to a rotary shaft 29, extending sideward in the body width direction from the left side of the powertrain unit 15. The change pedal 28 includes: a long and thin extending board portion 30 which extends, with the thickness direction thereof facing sideways, frontward from this socket cup 99 affixed to the rotary shaft 29 and, from a certain point thereof, diagonally leftward while extending frontward as well. The change pedal 28 also includes an operation pedal extension portion 31 projecting outward in the body width direction from the tip portion of this extending board portion 30.

Figure 2:
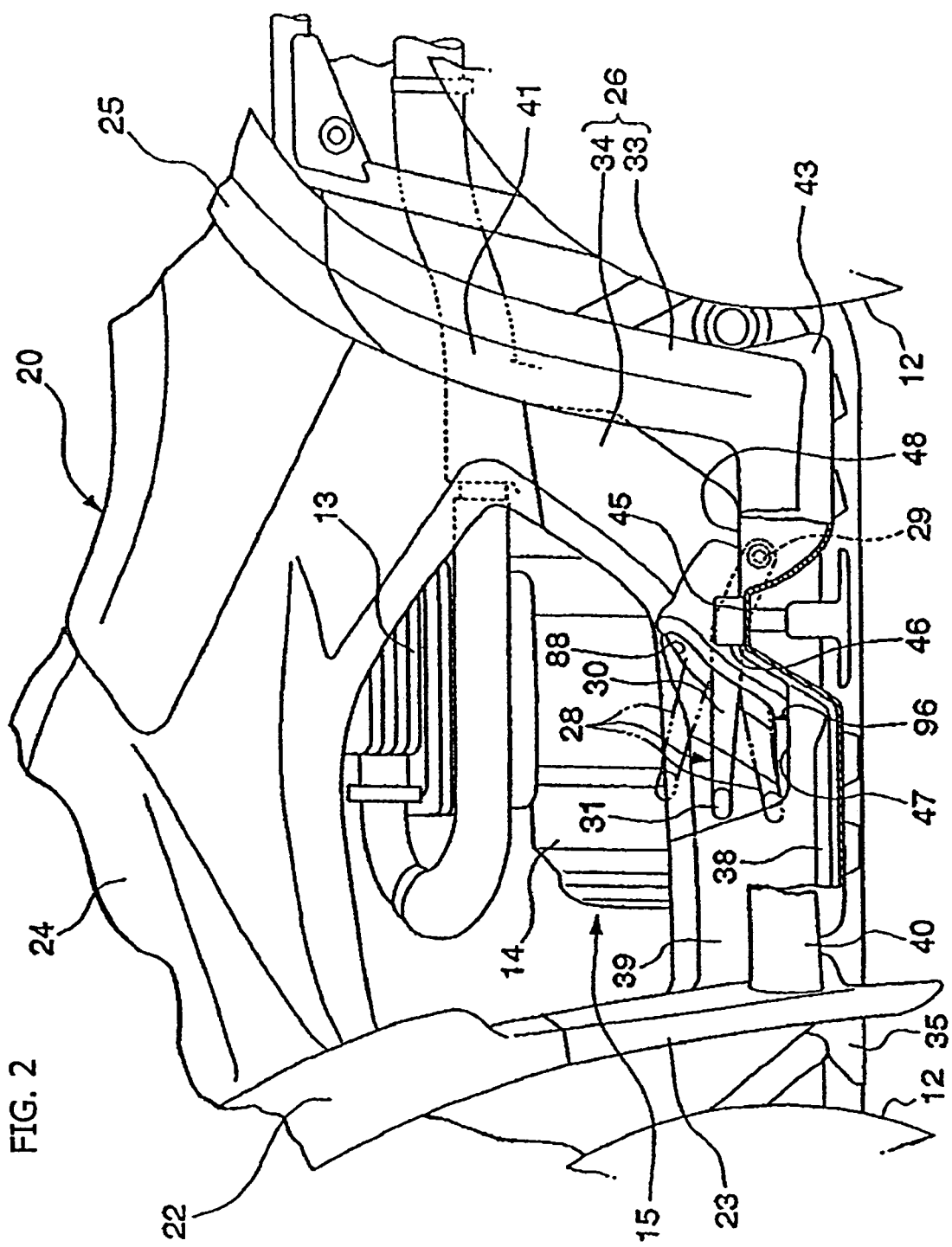
FIG. 2 is a side detail view of a running board according to a selected embodiment of the present invention, shown partly cut away and mounted on an all-terrain vehicle.

As shown in FIG. 2, the running board 26 of this embodiment includes: a running board main body 33 which is connected to the rear side of the sub-fender 23 and connected to the rear cover 25 so as to cover a front portion of the rear wheel 12; and an engine partition plate 34, which is a separate body other than the running board main body 33, and which is attached to this running board main body 33.

A description will now be given of the running board main body 33, in a state where it is attached to a body frame 35.

The running board main body 33 includes: a board portion 38 which extends frontward and rearward in a substantially horizontal orientation. The running board main body 33 also includes a pedestal portion 45 forming an upwardly projected shape in a middle portion thereof in the front-rear direction. The running board main body 33 further includes a sidewall portion 39 rising up from the edge of the board portion 38 on the powertrain unit 15 side thereof along the front-rear direction.

The running board main body 33 also includes an external wall portion 40 which rises upward from the edge of the powertrain unit 15 on the opposite side from the board portion 38 along the front-rear direction, and then goes downward at the outside thereof; and a sub-rear fender portion 41 which rises upward from the back of the board portion 38 along the body width direction so as to cover the front side of the rear wheel.

Here, the foregoing pedestal portion 45 of the board portion 38 extends laterally outwardly in the body width direction, and a step portion 46 is attached onto this pedestal portion 45. Note that this step portion 46 is configured to support a foot of a rider thereon.

Figure 4:
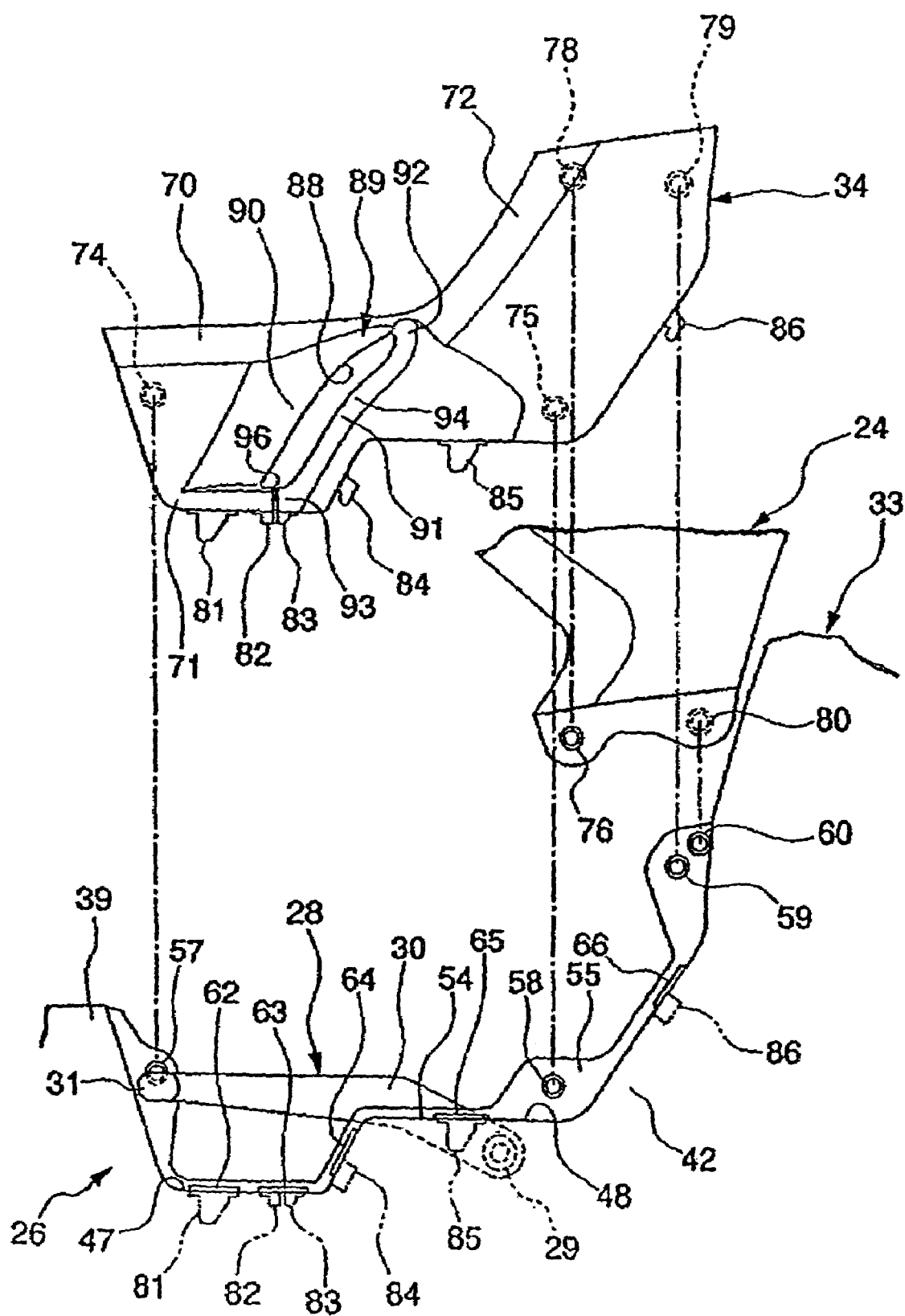
FIG. 4 is an exploded side view of the running board for an all-terrain vehicle according to the selected embodiment of the present invention.

Moreover, as also shown in FIG. 4, in the sidewall portion 39 of the running board main body 33, a front recessed portion 47 forming a downwardly recessed shape is formed, and, in the rear of this front recessed portion 47, a rear recessed portion 48 is formed shallower than the front recessed portion 47 and continuous with the front recessed portion 47. In addition, on the edge of these front and rear recessed portions 47 and 48, an attachment flange portion 55 is provided which is in parallel to the sidewall portion 39, slightly deviating toward the powertrain unit 15 side in the body width direction.

In this attachment flange portion 55, a plurality of elastic grommets 57 to 60 are provided. More specifically, the elastic grommet 57 is provided on a slightly upper side of the attachment flange portion 55 in the front of the front recessed portion 47, elastic grommet 58 is provided in the vicinity of the bottom of the rear recessed portion 48, and elastic grommets 59 and 60 are provided in the rear of the rear recessed portion 48, with each axis thereof being along the body width direction.

Moreover, a plurality of engagement slots 62 to 66 are formed in a base end edge portion 54 on the sidewall portion 39 side of the attachment flange portion 55, extending downwardly through the attachment flange portion 55. More specifically, the engagement slot 62 is formed in the base end edge portion 54 in the vicinity of the front of and at the bottom of the front recessed portion 47, engagement slot 63 is formed in the base end edge portion 54 in the vicinity of the rear of and at the bottom of the front recessed portion 47, engagement slot 64 is formed in the base end edge portion 54 in the vicinity of the rising portion in the rear of the front recessed portion 47, engagement slot 65 is formed in the base end edge portion 54 in the vicinity of the bottom of the rear recessed portion 48, and engagement slot 66 is formed in the base end edge portion 54 in the vicinity of the rising portion in the rear of the rear recessed portion 48, respectively. Here, these engagement slots 62 to 66 are in shapes of elongated holes stretching along the attachment flange portion 55. Note that the running board main body 33 is made of resin and is integrally molded.

As shown in FIG. 2, the engine partition plate 34 is provided as a body separate from the above-described running board main body 33 having the step portion 46. The engine partition plate 34 is attached to the running board main body 33 so as to be disposed between the powertrain unit 15 and the step portion 46 of the running board main body 33. A description will be given of the engine partition plate 34 in a state where it is attached to the running board main body 33.

As shown in FIG. 4, the engine partition plate 34 is structured to include: a front-rear extension portion 70 extending frontward and rearward along the front-rear direction and the upper-lower direction; a downward extension portion 71 extending downward from the front portion of the front-rear extension portion 70 along the front-rear direction and the upper-lower direction; and an inclined extension portion 72 extending upward from the rear portion of the front-rear extension portion 70 along the front-rear direction and the upper-lower direction while inclined such that the upper side thereof is in a more rear position.

With regard to the engine partition plate 34, in a front portion of the front-rear extension portion 70, a fitting shaft portion 74 which is formed projects toward the powertrain unit 15, thickened toward the end and is provided to be fitted to the elastic grommet 57 of the foregoing running board main body 33 is formed. In a rear portion of the front-rear extension portion 70, a fitting shaft portion 75 is formed which is projecting toward the powertrain unit 15, thickened toward the end and is to be fitted to the elastic grommet 58 of the running board main body 33. Moreover, with respect to an upper portion of the inclined extension portion 72, on the front side thereof, a fitting shaft portion 78 is formed which is projecting toward the powertrain unit 15, thickened toward the end, and is to be fitted to the elastic grommet 76 in a lower rear end portion of the center cover 24 and, on the rear side thereof, a fitting shaft portion 79 is formed which is projecting toward the powertrain unit 15, thickened toward the end, and is to be fitted to the elastic grommet 59 of the running board main body 33. Note that, a fitting shaft portion 80 in a lower rear end portion of the center cover 24 is fitted to the elastic grommet 60 in an upper rear end portion of the attachment flange portion 55.

Moreover, at a front portion of the bottom edge of the downward extension portion 71 of the engine partition plate 34, an engagement piece 81 is provided which extends downward and is engagable with the engagement slot 62 of the running board main body 33, and a pair of engagement pieces 82, 83 are provided at a rear portion of the bottom edge of the downward extension portion 71, which is extending downward and engaged with the engagement slot 63. Additionally, at a rear edge portion of the downward extension portion 71, a hook-shaped engagement piece 84 which is extending downward and engaged with the engagement slot 64 and an engagement piece 85 which is extending downward and engaged with the engagement slot 65 is formed at a rear portion of the bottom edge of the front-rear extension portion 70. Furthermore, a hook-shaped engagement piece 86 which is extending downward and engaged with the engagement slot 66 is formed at a rear edge portion of the inclined extension portion 72.

Moreover, in this embodiment, an insertion aperture 88, which is in a shape of elongated hole stretching substantially along the extension of the front edge of the inclined extension portion 72, is formed in the front-rear extension portion 70 and downward extension portion 71 of the engine partition plate 34 to penetrate in the body width direction. This insertion aperture 88 is one into which the change pedal 28 is to be inserted extending diagonally from the powertrain unit 15 in the left-front direction.

Here, a loop-shaped peripheral portion 89, which forms the insertion aperture 88 of the engine partition plate 34 is formed in a stepped structure, where a front peripheral portion 90 on the front side thereof is positioned on the powertrain unit 15 side of the operation pedal (right side in the body width direction). A rear peripheral portion 91 of the partition plate is positioned on the opposite side of the operation pedal from the front peripheral portion. To be more specific, as shown in FIG. 3, the front peripheral portion 90 is, as a whole, slightly inclined, such that the more rear side thereof bends slightly forward the powertrain unit 15. The rear peripheral portion 91 is in a recessed shape, and includes: leg portions 92 and 93 slightly rising from both top and bottom ends of the front peripheral portion 90 toward the body width direction; and a bridge portion 94 to connect these leg portions 92 and 93. Note that the engine partition plate 34 is made of a plastic resin, and is integrally molded with the fitting shaft portion 74, 75, 78 and 79 and the engagement pieces 81 to 86 extending outwardly thereon.

Additionally, in this embodiment, in the downward extension portion 71 of the engine partition plate 34, is a slot 96 formed vertically reaching a bottom edge portion of the engine partition plate 34, which is a side to be attached to the running board main board 33, from the bottom end of the insertion aperture 88. At this bottom edge portion, the aforementioned engagement pieces 82, 83 are separately formed so as to sandwich the slot 96 therebetween.

Next, a description will be given of attachment of the above-described engine partition plate 34 to the running board main body 33, that is attached beforehand to the body frame 35 on which the powertrain unit 15, including the change pedal 28, is mounted.

Note that the center cover 24 is also attached to the body frame 35 in advance, and the fitting shaft portion 80 thereof is fitted to the top-end elastic grommet 60 of the running board main body 33.

The engine partition plate 34 is positioned, as a whole, along the front-rear direction and the upper-lower direction, such that the front-rear extension portion 70 is long in the front-rear direction, and then moved downward from above the running board main body 33.

At this time, with regard to the extending board portion 30 of the change pedal 28 extending forwardly from the powertrain unit 15, which is mounted beforehand on the body frame 35 while diagonally inclined outward, it is inserted into the insertion aperture 88 through the slot 96 reaching the bottom edge of the engine partition plate 34.

Thereafter, while the engine partition plate 34 is slightly inclined with the top end tilted slightly outwardly such that the upper side thereof is positioned farther away from the powertrain unit 15 than the lower side thereof, the engagement piece 81 is engaged with the engagement slot 62 of the running board main body 33, the pair of engagement pieces 82, 83 is engaged with the common engagement slot 63 of the running board main body 33, the hook-shaped engagement piece 84 is engaged with the engagement slot 64 of the running board main body 33, the engagement piece 85 is engaged with the engagement slot 65 of the running board main body 33, and hook-shaped engagement piece 86 is engaged with the engagement slot 66 of the running board main body 33, respectively (the engagement pieces 81 to 86 after engagement are shown by chain double-dashed lines in FIG. 4).

Next, while the inclination of the engine partition plate 34 is gradually reduced, the fitting shaft portion 74 is fitted into the elastic grommet 57 of the running board main body 33, the fitting shaft portion 75 is fitted into the elastic grommet 58 of the running board main body 33, the fitting shaft portion 78 is fitted into the elastic grommet 76 of the center cover 24, and the fitting shaft portion 79 is fitted into the elastic grommet 59 of the running board main body 33, respectively. Thus, the engine partition plate 34 is attached to the running board main body 33 and the center cover 24.

According to the above-described running board 26 of this embodiment, between the powertrain unit 15 and the step portion 46, the engine partition plate 34 is provided as a partition along the front-rear direction and the upper-lower direction. Hence, snow, mud and the like coming through a space between the running board 26 and the powertrain unit 15 will hit this engine partition plate 34, and will be substantially prevented from landing onto the running board 26. Moreover, heat from the powertrain unit 15 released toward feet of a rider will be blocked by the engine partition plate 34. Furthermore, since the insertion aperture 88 into which the change pedal 28 is to be inserted is provided in the engine partition plate 34, the engine partition plate 34 can be made sufficiently wide even with the change pedal 28, whereby snow, mud and the like are substantially prevented from landing onto the running board 26, and heat from the powertrain unit 15 released toward feet of a rider can be blocked.

Moreover, upon attachment to the body on which the powertrain unit 15 including the change pedal 28 is mounted, the running board main body 33 with the step portion 46 is attached thereto in advance, and then the engine partition plate 34 as a body other than the running board main body 33 is attached to the running board main body 33 while allowing the change pedal 28 to pass therethrough from the edge thereof through the slot 96 reaching the edge, and to be inserted into the insertion aperture 88. Accordingly, even with the change pedal 28 to be inserted into the insertion aperture 88 of the engine partition plate 34, the attachment can be easily performed. In addition, in the engine partition plate 34, since the slot 96 reaches, from the insertion aperture 88, the edge on the side to be attached to the running board main body 33, the portion split by means of the slot 96 can be fixed to the running board main body 33 when attached to the running board main body 33. In other words, as described above, the pair of engagement pieces 82, 83 is provided on both sides sandwiching the slot 96, and these engagement pieces 82 and 83 are engaged with the common engagement slot 63 of the running board main body 33. Thus, the portion split by means of the slot 96 can be fixed to the running board main body 33 to be integrated therewith. Accordingly, even with the slot 96, relative rigidity of the engine partition plate 34 can be effectively secured.

Moreover, the front peripheral portion 90 of the peripheral portion 89 forming the insertion aperture 88 of the engine partition plate 34 is positioned on the powertrain unit 15 side, while the rear peripheral portion 91 is positioned on the opposite side of the operation pedal, and the insertion aperture 88 opens front-outward from the engine partition plate 34. Therefore, snow, mud and the like which hit the engine partition plate 34 through a space between the powertrain unit 15 and the engine partition plate 34 hardly enter the insertion aperture 88. Hence, snow, mud and the like coming through the insertion aperture 88 can be prevented from landing onto the running board 26 during traveling.

In addition, the fitting shaft portion 74, 75, 78 and 79 and the engagement pieces 81 to 86 are integrally molded to the engine partition plate 34, the engagement slots 62 to 66 are integrally molded to the running board main body 33 while the elastic grommets 57 to 60 are provided therein, and the elastic grommet 76 is provided in the center cover 24. The fitting shaft portion 80 of the center cover 24 is fitted into the elastic grommet 60 of the running board main body 33, and then the engagement pieces 81 to 86 are engaged with the engagement slots 62 to 66 while the fitting shaft portions 74, 75, 78 and 79 are fitted into the elastic grommets 57, 58, 76 and 59, respectively, whereby the engine partition plate 34 is attached to the running board main body 33 and the center cover 24. Thus, serviceability can be improved, and cost can be controlled.

As has been described above, according to a first aspect of the invention, the partition is provided between the engine and the step portion, extending along the front-rear direction and the upper-lower direction. Hence, snow, mud and the like coming through a space between the running board and the engine will hit this partition, and will thereby be substantially prevented from landing onto the running board. Moreover, heat from the engine released toward feet of a rider will be blocked by the partition. Furthermore, since the insertion aperture into which the operation pedal is to be inserted, is provided in the partition, the partition can be made sufficiently wide even with the operation pedal extending therethrough, whereby snow, mud and the like are substantially prevented from landing onto the running board, and heat from the engine released toward feet of a rider can be blocked.

According to a second aspect of the invention, upon attachment to the body on which the engine including the operation pedal is mounted, the running board main body with the step portion is attached thereto in advance, and then the partition as a body other than the running board main body is attached to the running board main body while allowing the operation pedal to pass therethrough from the edge thereof through the slot reaching the edge, and to be inserted into the insertion aperture. Accordingly, even with the operation pedal to be inserted into the insertion aperture of the partition, the attachment can be easily performed. In addition, in the partition, since the slot reaches, from the insertion aperture, the edge on the side to be attached to the running board main body, the portion split by means of the slot can be fixed to the running board main body when attached to the running board. Accordingly, even with the slot, rigidity of the partition can be secured.

According to a third aspect of the invention, the front side of the peripheral portion forming the insertion aperture of the partition is positioned on the engine side while the rear side thereof is positioned on the opposite side of the operation pedal. Therefore, snow, mud and the like which hit the partition through a space between the engine and the partition hardly enter the insertion aperture. Hence, snow, mud and the like can be substantially prevented from landing on the running board during traveling.

Although the present invention has been described herein with respect to a specific illustrative embodiment thereof, the foregoing description is intended to be illustrative, and not restrictive. Those skilled in the art will realize that many modifications of the embodiments could be made which would be operable. All such modifications which are within the scope of the claims are intended to be within the scope and spirit of the present invention.

What is claimed is:

1. A running board apparatus for an all-terrain vehicle, said running board apparatus comprising:
   a step portion for lateral placement on a side of a powertrain unit having an operation pedal extending outwardly from a side portion thereof, said step portion adapted to support a foot of a rider thereon; and
   a partition plate for placement on the vehicle between the powertrain unit and the step portion, the partition plate having an elongated insertion aperture formed therein for allowing the operation pedal to extend therethrough, wherein the insertion aperture extends substantially diagonally along the partition plate.

2. A running board apparatus for an all-terrain vehicle, said running board apparatus comprising:
   a step portion for lateral placement on a side of a powertrain unit having an operation pedal extending outwardly from a side portion thereof, said step portion adapted to support a foot of a rider thereon;
   a partition plate for placement on the vehicle between the powertrain unit and the step portion, the partition plate having an insertion aperture formed therein for allowing the operation pedal to extend therethrough; wherein the insertion aperture extends along the partition plate in both a front-rear direction and an upper-lower direction;
   wherein the step portion is provided as part of a running board main body; and
   wherein the partition plate is provided as a separate body from the running board main body, and includes a slot extending from the insertion aperture to an edge of the partition plate.

3. A running board apparatus for an all-terrain vehicle, said running board apparatus comprising:
   a step portion for lateral placement on a side of a powertrain unit having an operation pedal extending outwardly from a side portion thereof, said step portion adapted to support a foot of a rider thereon; and
   a partition plate for placement on the vehicle between the powertrain unit and the step portion, the partition plate having an insertion aperture formed therein for allowing the operation pedal to extend therethrough; wherein the insertion aperture extends along the partition plate in both a front-rear direction and an upper-lower direction; and
   wherein a peripheral portion of the partition plate, surrounding the insertion aperture, is formed with a stepped structure, such that in an installed configuration thereof, a front side of the peripheral portion is positioned to an engine side of the operation pedal, and a rear side thereof is positioned on the opposite side of the operation pedal from the front side.

4. An all-terrain vehicle, comprising:
   a frame;
   a powertrain unit operatively attached to the frame and having an operation pedal extending outwardly from a side portion thereof;
   a body cover for covering the frame, said body cover comprising a running board apparatus which comprises:
   a running board main body for placement on a side of said powertrain unit, said running board main body comprising a step portion adapted to support a foot of a rider thereon; and
   a partition plate disposed between the engine and the step portion, the partition plate having an insertion aperture formed therein, allowing an end portion of the operation pedal to extend therethrough;
   wherein a peripheral portion of the partition plate, surrounding the insertion aperture, is formed with a stepped structure, such that a front side of the peripheral portion is positioned to an engine side of the operation pedal, and a rear side thereof is positioned on the opposite side of the operation pedal from the front side.

5. The all-terrain vehicle according to claim 4, wherein the partition plate, is provided as a separate body from the running board main body, and wherein the partition plate includes a slot extending from the insertion aperture to an edge thereof.

6. The running board apparatus for an all-terrain vehicle according to claim 1, wherein the insertion aperture extends diagonally from the powertrain unit in a left-front direction.

7. The running board apparatus for an all-terrain vehicle according to claim 2, wherein the slot is oriented substantially vertically.

8. The running board apparatus for an all-terrain vehicle according to claim 2, wherein the slot is adapted for insertion of the operational pedal therethrough.

9. The running board apparatus for an all-terrain vehicle according to claim 1, wherein the partition plate includes an inclined extension portion and the elongated insertion aperture is formed on the inclined extension portion.

10. The running board apparatus for an all-terrain vehicle according to claim 1, wherein the partition plate is formed of resin and adapted to resist transfer of engine heat therethrough.

11. The running board apparatus for an all-terrain vehicle according to claim 1, wherein the partition plate is adapted to provide a partition between the step portion and the powertrain unit.

12. The running board apparatus for an all-terrain vehicle according to claim 1, further includes a base having a plural engagement slots; and the partition plate includes a plural engagement pieces; wherein the engagement pieces of the partition plate are engaged with the engagement slots of the base for mounting the partition plate on the base.

13. The all-terrain vehicle according to claim 4, wherein the insertion aperture extends diagonally from the powertrain unit in left-front direction.

14. The all-terrain vehicle according to claim 5, wherein the slot is oriented substantially vertically.

15. The all-terrain vehicle according to claim 5, wherein the slot is adapted for insertion of the operational pedal therethrough.

16. The all-terrain vehicle according to claim 4, wherein the insertion aperture has an elongated shape.

17. The all-terrain vehicle according to claim 4, wherein the partition plate includes an inclined extension portion and the insertion aperture is formed on the inclined extension portion.

18. The all-terrain vehicle according to claim 4, wherein the partition plate is formed of resin and adapted to resist transfer of engine heat therethrough.

19. The all-terrain vehicle according to claim 4, wherein the partition plate is adapted to provide a partition between the step portion and the powertrain unit.

* * * * *